Figure 1:
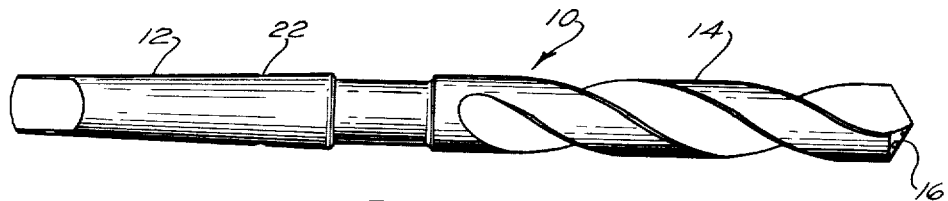

July 9, 1963

H. J. MAYNARD 3,096,668

MIST COOLED CUTTING TOOL

Filed April 25, 1962

INVENTOR.
HARLAN J. MAYNARD
BY
Morse & Altman
ATTORNEYS

United States Patent Office 3,096,668
Patented July 9, 1963

3,096,668
MIST COOLED CUTTING TOOL
Harlan J. Maynard, 341 E. 33rd St., New York, N.Y.
Filed Apr. 25, 1962, Ser. No. 190,019
10 Claims. (Cl. 77—68)

This invention relates in general to cutting tools and more particularly concerns a new and improved drill that is particularly useful with a drilling apparatus equipped with a mist cooling system.

In U.S. Patent 2,946,244 there is disclosed a novel method and associated apparatus for cooling cutting tools by introducing a constant flow of pressurized cooling vapor from a mist forming station to the cutting area of the tool. It has been found that cutting tools cooled according to the teaching of this patent are able to operate more efficiency and for longer periods of continuous use than any other tool previously available.

Described and illustrated in the above mentioned patent is a twist drill in use with a radial drill equipped with a mist cooling system. This drill is formed with a pair of helical passages for delivering mist from an inlet port in the shank of the drill to openings formed in the drill tip. While a drill of this construction has proven generally satisfactory in use, it has been found that with large size drills it is practically impossible to cover efficiently the entire cutting area of the drill tip by using but a single pair of conventional coolant passages. Furthermore, the sudden release of pressure when the drill tip emerges from a back surface of a workpiece frequently causes damage to the drill tip because the sudden drop in the flow of the cooling mist to the tip results in a sharp increase in the operating temperature of the drill.

Accordingly, it is an object of the present invention to provide a new and improved cutting tool for use with metal cutting machines equipped with fluid cooling systems for removing heat generated by the cutting tool.

Another object of this invention is to increase the useful life of cutting tools of the sort used with metal cutting machines equipped with fluid cooling systems for removing heat generated by the cutting tool.

A more specific object of this invention is to provide a twist drill of improved construction and design for use especially with a drilling machine equipped with a fluid cooling system for removing heat generated by the drill.

Yet another object of this invention is to increase metal removal rates in metal cutting operations.

Still another object of this invention is to increase the speed of penetration in metal drilling operations and simultaneously improve the finish of the cut surface.

More particularly, this invention features a cutting tool in which passages formed within a cutting tool, such as a drill, terminate with a plurality of discharge ports, located across the face of the drill tip in proximity to the cutting edge thereof. In a preferred embodiment of this invention, a twist drill is formed with at least four helical passages terminating at the conical cutting tip and adapted to deliver a constant flow of cooling vapor to the cutting area. The discharge ports are radially spaced from one another and in a modification of the invention the outer ports have a larger cross-sectional area than the inner ports so that the loss of back pressure will be held to a minimum when the point of the drill tip, along with the adjacent inner ports, breaks through the back surface the workpiece.

Figure 2:
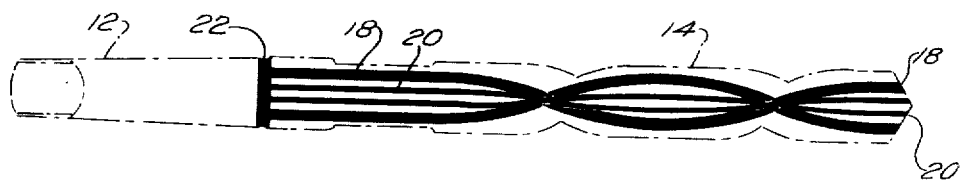
Figure 3:
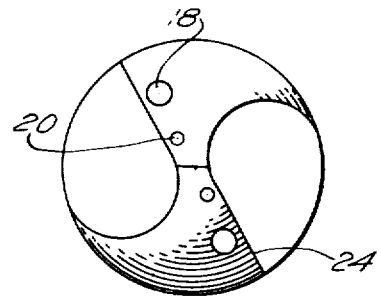
Figure 4:
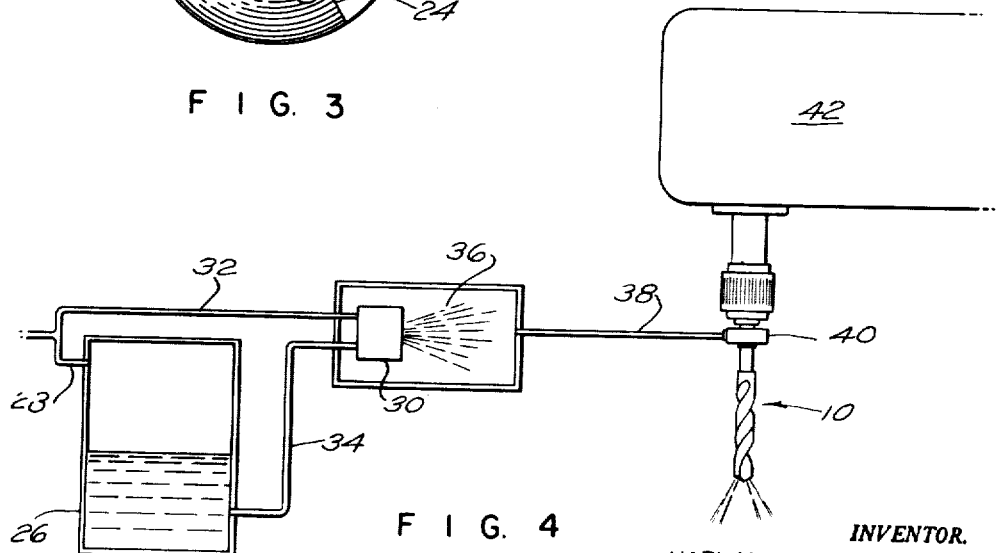

But these and other features of the invention, along with further objects and advantages thereof, will become more readily apparent from the following detailed description of a preferred embodiment of the invention, with reference being made to the accompanying drawings in which:

FIG. 1 is a view in side elevation of a twist drill made according to the invention, FIG. 2 is a phantom side elevation illustrating the helical cooling passages formed within the drill of FIG. 1, FIG. 3 is a view in end elevation showing the drill tip, and FIG. 4 is a view, somewhat schematic, of the drill in FIGS. 1–3 as it is used with a vapor cooling system.

Referring now to the drawings, reference character 10 generally indicates a metal twist drill embodying features of this invention. As shown, the drill is one piece affair having a tapered shank portion 12 and a double fluted auger portion 14 terminating in a profiled conical drill tip 16. Typically, the drill is formed with a 30° right hand spiral with a tip bevel of 118° and, in practice, the drill may be made in a variety of sizes ranging from a class of small diameter devices to drills having diameters in excess of 3" and lengths of 20" or more. Preferably, the drill body is fabricated from an alloy of steel displaying a hardness characteristic of about 64 on the Rockwell C scale. Obviously, the particular configuration, dimensions and materials used in the tool may be varied in numerous ways according to particular needs.

In any event, as may be seen in FIGS. 2 and 3, the drill is provided with a plurality of internal passages 18 and 20 which extend from the drill tip 16 helically back through the auger portion 14 into communication with a transverse passageway 20 formed diametrically through the shank portion 12. In the illustrated embodiment, the passageways are four in number, two for each flute, and arranged in spaced radial relation to one another. It will be appreciated that the construction provides a multiplicity of discharge ports in proximity to each cutting edge of the drill. Obviously more than two ports can be provided for each cutting edge and in general the number will depend upon the size of the drill with large diameter drills being provided with a greater number of holes. It will be appreciated that a single aperture on each flute would not provide even distribution of cooling vapor across the drill tip particularly where the drill is of a large diameter. Even and complete coverage of the drill tip with a vapor coolant is of particular importance in large drills such as those of 2" diameter or more for example. In drills of this size the chisel is large and a considerable amount of gouging takes place in cutting, with the result that a tremendous amount of heat is generated. This heat must be continuously and uniformly removed to prevent it from building up in the work or in the drill. It is important to note that successful operation depends upon continuous delivery of a large volume of cooling mist to the drill tip at a proper rate of penetration.

The discharge ports for the passageways are located at the tip of the drill as close as practical to its cutting edges 24. The total cross sectional area of the several discharge ports should be less than the total cross sectional area of the inlet ports at the transverse passageway 22 for the reason that if the openings are large in relation to the conduits in the mist producing system, back pressure could not be developed and the drill would not operate efficiently.

Since the tip of the drill has a generally conical configuration, the center portion about the point or chisel, as it is sometimes called, moves in advance of the corners or outer circumferential portion as is clear in FIG. 1. It will, therefore, be appreciated that if both passages 18 and 20 and their tip discharge ports had the same cross-sectional areas a substantial amount of the cooling vapor back pressure would be lost when the drill point emerges from the back surface of a work piece. The opening of the inner ports 20 to the air would normally result in a sudden drop in back pressure so that the flow of cooling mist through the outermost ports 18 is reduced. During the period that the outer and trailing part of the tip is still cutting through the metal while the inner forward point is exposed, the loss of coolant flow through the outer passage 18 might cause irreparable damage to the drill. The outer portion of the tip would, under such conditions, undergo a sudden rise in temperature with the result that the crystalline structure of the metal in the drill would undergo a permanent and damaging change.

This problem has now been overcome by making the innermost passages 20 with cross-sectional areas that are less than the cross-sectional areas of the outer passages 18. With this arrangement, the back pressure loss that takes place when the drill point and inner orifices break through the surface is substantially reduced and sufficient mist coolant continues to flow through the outer passages 18 to protect the drill.

Preferably, the openings for the inner passages 20 should be as close as practical to the tip or chisel while the openings for the outer passages 18 should be as close as practical to the circumferential edges or corners of the drill. In practice, the helical passageways are customarily formed by drilling straight holes through a drill blank. The blank is subsequently twisted, the flutes cut and the drill heat treated. Another method of forming the passageways, particularly the outermost ones, involves machining channels along the outer surfaces of the flutes, preferably after the drill has been twisted. These channels may then be sealed over in some fashion or a tube may be seated in each channel and subsequently welded or soldered in place.

In FIG. 4 there appears a schematic diagram of a mist cooling system in use with a drilling apparatus. The system includes a closed tank 26 with a supply of water and connected to a source of pressurized air through a conduit 28. A mist forming station 30 is supplied by a conduit 32 with a flow of pressurized air while a conduit 34 supplies a jet of water with the air and water being combined as a mist in a chamber 36. From there a conduit 38 delivers the mist to an annular collar 40 mounted over the shank of the drill in register with the transverse passage 22 and connected to the shank by a rotatable seal. The upper end of the shank is seated in the chuck of a drilling apparatus 42. A constant flow of mist is thus delivered into the drill where it passes helically down through the passages in the auger portion, cooling the flutes, and passing out the discharge ports to cool the tip.

It should be noted that the multiple passages in each flute provide much more efficient cooling of the auger portion of the drill than is possible with a single passage running through each flute. This consideration is of particular importance where large diameter drills are concerned. Drills 2 and 3" in diameter are quite massive and normally absorb a substantial amount of the heat developed by the friction of the drill against the walls of the bore hole. This heat must be continuously and uniformly removed otherwise the drill will not operate efficiently. By distributing a number of relatively small mist-carrying passages through each flute, the heat is carried off in a very efficient fashion and the entire drill body is maintained at a cool temperature.

The drill has proven to be extremely efficient in operation and has substantially reduced the time required to drill through hard substances such as steel or the like. In one test, using a 3⅞₆" diameter conventional drill, the penetration rate through steel was .6 inch per minute while using one of the above described drills of the same size the pentration rate was increased to 3.02 inches per minute, and this being done through an 8" block of steel without once retracting the drill. Not only is the drilling rate greatly increased but also the manner in which the metal is cut has been improved. For example, under previous practices, chips or shavings up to 4' long were formed while the present drill, with increased speed and feed, makes the chips break up in a much more efficient manner. The character of chip breakage is an important factor in many types of drilling.

In another test, using the same 3⅞₆" diameter drill at 104 r.p.m. and with .029" feed per revolution, a penetration rate of 2.976 inches per minute was achieved. The total elapsed drilling time for an 8" deep hole was three minutes and 29 seconds as against 14 minutes for a conventional drill.

While the invention has been described with particular reference to the illustrated embodiments, it will be understood that numerous modifications will appear to those skilled in the art. The invention may be applied to advantage in numerous types of cutting tools other than the drill illustrated. Also, the number of passages may be increased and their locations varied. Many other modifications may be made without departing from the spirit of this invention. Therefore, the description and the accompanying drawings should be taken as illustrative of the invention rather than in a limiting sense.

Having thus described my invention, what I claim and desire to obtain by Letters Patent of the United States is:

1. A cutting tool for use with a mist cooling system, comprising a drill body of hardened metal, said drill body being fromed with at least one cutting edge, said body being formed with a plurality of internal passages, said passages terminating at one end in discharge ports located in proximity to said cutting edge and at another end in inlet ports located at a distance from said discharge ports, the total cross-sectional area of said inlet ports being greater than the total cross-sectional area of said discharge ports, said passages being adapted to deliver a flow of cooled mist to said cutting edge.

2. A cutting tool for use with a mist cooling system, comprising a drill body, said drill body having at least one cutting edge defining a bevel, said body being formed with a plurality of internal passages, said passages terminating at one end in discharge ports spaced along said bevel in proximity to said cutting edge and at another end in inlet ports located at a distance from said discharge ports, the total cross-sectional area of said inlet ports being greater than the total cross-sectional area of said discharge ports, said passages being adapted to deliver a flow of cooled mist to said cutting edge.

3. A cutting tool for use with a mist cooling system, comprising a drill body, said drill body having at least one cutting edge, defining a bevel, said body being formed with a plurality of internal passages, said passages terminating at one end in discharge ports spaced along said bevel in proximity to said cutting edge and at another end in inlet ports located at a distance from said discharge ports, the cross-sectional area of the discharge port adjacent the leading end of said bevel being less than the cross-sectional area of the discharge port at the trailing end of said bevel and the total cross-sectional area of said inlet ports being at least equal to the total cross-sectional area of all of said discharge ports, said passages being adapted to deliver a flow of cooled mist to said cutting edge.

4. A cutting tool for use with a mist cooling system, comprising a drill body, said drill body having at least one cutting edge defining a bevel, said body being formed with a plurality of internal passages, said passages terminating at one end in discharge ports spaced along said bevel in proximity to said cutting edge and at another end in inlet ports located at a distance from said discharge ports, the cross-sectional area of the discharge port adjacent the leading end of said bevel being less than the cross-sectional area of the discharge port at the trailing end of said bevel, said passages being adapted to deliver a flow of cooled mist to said cutting edge.

5. A twist drill for use with a mist cooling system, comprising a drill body of hardened metal, said body including a shank portion and an auger portion, said auger portion being formed with a plurality of helical flutes and terminating in a tip, said tip being formed with a plurality of cutting edges, said flutes each being formed with a plurality of radially spaced internal passages extending helically from said shank portion through said auger portion to said tip, said shank portion being formed with an inlet port in communication with said passages, said tip being formed with a plurality of discharge ports in communication with said passages, each of said flutes being provided with at least two discharge ports radially spaced across the tip end thereof.

6. A twist drill for use with a mist cooling system, comprising a drill body, said body including a shank portion and a drill portion, said drill portion being formed with a plurality of flutes and terminating in a tip, said tip being formed with a plurality of cutting edges, said flutes each being formed with a plurality of radially spaced internal passages extending from said shank portion through said drill portion to said tip, said shank portion being formed with an inlet port in communication with said passages, said tip being formed with a plurality of discharge ports in communication with said passages, each of said flutes being provided with at least two discharge ports at the tip end thereof, the total cross-sectional area of said inlet port being at least equal to the total cross-sectional area of all of said discharge ports.

7. A twist drill for use with a mist cooling system, comprising a drill body of hardened metal, said body including a shank portion and an auger portion, said auger portion being formed with a plurality of helical flutes and terminating in a beveled tip, said tip being formed with a plurality of cutting edges extending between the center of said tip and the outer circumferential edge of said tip, said flutes each being formed with a plurality of radially spaced internal passages extending in a helical path from said shank portion through the flutes of said auger portion to said tip, said shank portion being formed with at least one inlet port in communication with said passages, said tip being formed with a plurality of discharge ports in communication with said passages, each of said flutes being provided with at least two discharge ports at the tip end thereof with at least one of the discharge ports in each flute being located near the center of said drill and at least one being located near the circumferential edge of said drill.

8. A twist drill for use with a mist cooling system, comprising a drill body, said body including a shank portion and an auger portion, said auger portion being formed with a plurality of helical flutes and terminating in a beveled tip, said tip being formed with a plurality of cutting edges extending between the center of said tip and the outer circumference of said tip, said drill body being formed with a plurality of internal passages extending in a helical path from said shank portion through said auger portion to said tip, said shank portion being formed with at least one inlet port in communication with said passages, said tip being formed with a plurality of discharge ports in communication with said passages, each of said flutes being provided with at least two discharge ports at the tip end thereof with at least one of the discharge ports in each flute being located near the center of said drill and at least one being located near the circumferential edge of said drill, the cross-sectional area of the discharge ports near said center being less than the cross-sectional area of the discharge ports near said corner and the total cross-sectional area of said inlet ports being at least equal to the total cross-sectional area of all of said discharge ports.

9. A twist drill for use with a mist cooling system, comprising a drill body of hardened metal, said body including a shank portion and an auger portion, said auger portion being formed with a plurality of helical flutes and terminating in a profiled conical tip, said tip being formed with a plurality of cutting edges extending between the drill chisel at the center of said tip and the drill corners at the outer circumference of said tip, said drill body being formed with a plurality of internal passages extending in a helical path from said shank portion through said auger portion to said tip, said shank portion being formed with at least one inlet port in communication with said passages, said tip being formed with a plurality of discharge ports in communication with said passages, each of said flutes being provided with at least two discharge ports at the tip end thereof with at least one of the discharge ports in each flute being located near the chisel of said drill and at least one being located near the corner of said drill, the cross-sectional area of the discharge port near said chisel being less than the cross-sectional area of the discharge port near said corner and the total cross-sectional area of said inlet port being at least equal to the total cross-sectional area of all of said discharge ports.

10. A cutting tool for use with a mist cooling system, comprising an elongated drill body of hardened metal, said drill body being formed with at least one cutting edge, said body being formed with at least one internal passage, said passage terminating at one end in a plurality of discharge ports located in proximity to said cutting edge and at another end in inlet ports located at a distance from said discharge ports, said ports having cross-sectional areas that differ one from another and being arranged along said edge in graduated order.

References Cited in the file of this patent

UNITED STATES PATENTS

| | | |
|---|---|---|
| 580,399 | Hoenscheid | Apr. 13, 1897 |
| 2,148,805 | Cogsdill | Feb. 28, 1939 |
| 2,237,901 | Chun | Apr. 8, 1941 |
| 2,946,244 | Maynard | July 28, 1960 |

Notice of Adverse Decision in Interference

In Interference No. 94,208 involving Patent No. 3,096,668, H. J. Maynard, MIST COOLED CUTTING TOOL, final judgment adverse to the patentee was rendered Jan. 6, 1966, as to claims 3, 4 and 10.

[*Official Gazette June 28, 1966.*]